Feb. 2, 1954  A. P. GLENNY ET AL  2,667,705
GYROSCOPIC APPARATUS
Filed Jan. 4, 1950
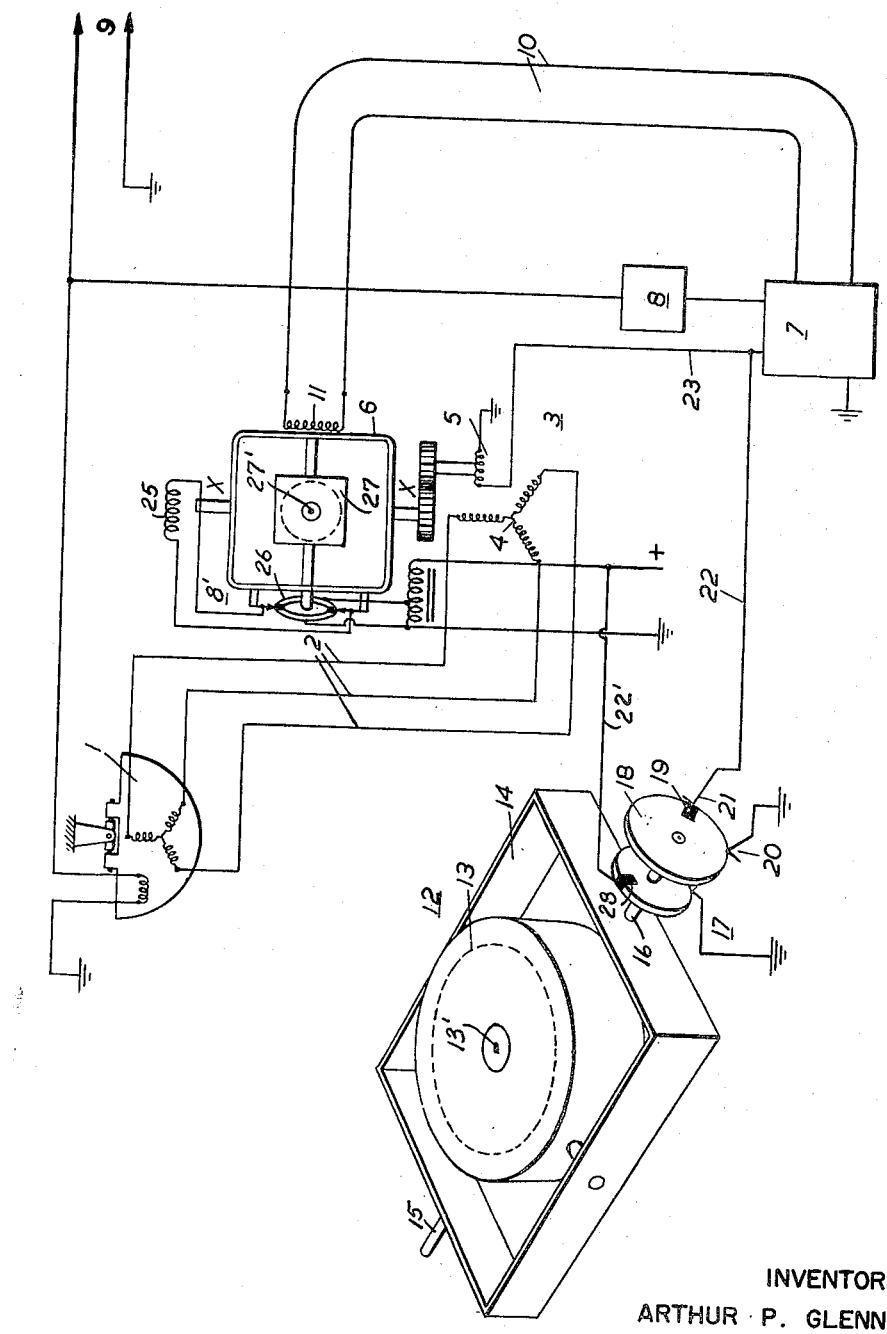
INVENTORS
ARTHUR P. GLENNY
DIMITRI WALOFF
By Herbert H. Thompson
Attorney Patented Feb. 2, 1954

2,667,705

UNITED STATES PATENT OFFICE 2,667,705

GYROSCOPIC APPARATUS

Arthur Philip Glenny, Hanworth, and Dimitri Waloff, Ealing, London, England, assignors, by mesne assignments, to The Sperry Gyroscope Company, Limited, Brentford, England, a British company Application January 4, 1950, Serial No. 136,709

6 Claims. (Cl. 33—222)

This invention relates to gyroscopic apparatus of the kind in which a gyroscope is caused to assume a position determined for it by a reference control member by the application of precessional torques to it from an electrically-operated torque motor which is energized, through a control circuit, under the control of the control member.

Various types of such gyroscopic apparatus are susceptible to errors during turns of a craft on which the apparatus is mounted. For instance, if the gyroscopic apparatus is of the kind in which a direction, for example a vertical direction or an azimuth direction is provided by a gyroscope under the control of a pendulously-supported control member, which is adapted to control the application of precessional torques to the gyroscope in dependence on relative angular displacement of the gyroscope and its control member, the control member is deflected from the true vertical under the action of centrifugal forces acting on it when the craft turns. As a result precessional torques are applied to the gyroscope that cause it to precess, with the result that it provides an erroneous direction.

It is accordingly an object of the present invention to provide means for substantially obviating the error or errors thus produced in gyroscopic apparatus of the kind referred to during turns of the craft.

In accordance with the invention, therefore, there is provided in or for gyroscopic apparatus of the kind referred to, an arrangement for modifying the control circuit during turns of the craft, in such a manner as to nullify substantially the effect of the erecting or precessing torques on the gyroscope, said arrangement comprising a switch controlled in dependence on bank of the craft about its fore-and-aft axis through a predetermined angle.

The control circuit may conveniently be modified by including the switch directly in the power supply to the torque motor, so as to cut off the power supply on bank of the craft greater than the predetermined angle. Alternatively, the control circuit may be modified by including a relay-operated switch in the control circuit, which may be arranged to cut off the power supply to the torque motor on bank of the craft greater than the predetermined angle, the relay being incorporated in a separate circuit which includes the switch operated by bank of the craft.

The switch operated on bank of the craft may conveniently be operated from a member gyroscopically stabilised against movement about the fore-and-aft axis of the craft.

In a preferred form of the invention, the switch operated on bank of the craft is operated by an extension of the outer fore-and-aft pivot shaft of a gimbel-mounted gyro-vertical normally provided in the craft as an artificial-horizon indicating instrument or as a controlling instrument in an automatic pilot, the switch taking any suitable form which is made or broken on relative rotation of two members.

An embodiment of the invention will now be described, by way of example, with reference to the accompanying drawing which illustrates schematically a gyro-magnetic compass of well known type and a part of a standard gyro-vertical instrument having a cut-out switch.

As shown the gyro-magnetic compass may comprise a magnetic compass of any suitable form, such as a pendulously-supported magnetic-field-responsive device 1 which provides an electrical output in the leads 2 depending on the orientation of the device in the horizontal component of the earth's magnetic field. The electrical output is supplied to the three-phase windings of the stator 4 of a signal transformer 3. The rotor 5 of the transformer is shown as connected to be positioned by azimuth movement about the axis of the vertical ring 6 of a directional gyroscope 8' only part of which is shown. A compass card (not shown) is usually affixed to the vertical ring for showing the craft's magnetic heading. When there is positional disagreement between the magnetic-field-responsive device and the earth's field and the azimuth position of the gyroscope and the earth's field, an alternating electrical signal is generated in the winding of the rotor 5 which represents this positional disagreement in magnitude and sense.

The output from the winding of the rotor 5 is supplied to a phase-sensitive amplifier 7 to which is also supplied the electrical output of a frequency doubler 8 for phase comparison purposes. The frequency doubler 8 supplies the amplifier with electrical signals at double the frequency of the supply 9, this being necessary because the output from the magnetic-field-responsive device is at double the frequency of the supply.

The output from the amplifier 7, which is a direct signal representing in magnitude and sense the positional disagreement between the directional gyroscope and the magnetic-field-responsive device relative to the horizontal component of the earth's field, is supplied along lines 10 to the windings 11 of a precession torque motor. The torque motor serves to precess the gyroscope until it positions the rotor 5 into a position in which there is no signal from the winding of the rotor 5 and therefore no positional disagreement between the gyroscope and the magnetic-field-responsive device. In this way the gyroscope follows faithfully the movements of the device 1 relative to the horizontal component of the earth's field and enables a stabilised indication of the position of a craft relative to the magnetic north to be provided.

During a turn of a craft on which the compass may be mounted the resulting horizontal accelerations will act on the pendulously-mounted device 1 to deflect it from the vertical whereupon it becomes sensitive also to the vertical component of the earth's magnetic field. As a result erroneous signals will be transmitted to the windings of the stator 4 which will thereby produce a signal in the winding of the rotor 5 which in turn will be effective to produce precession of the gyroscope away from its azimuthal position relative to the magnetic north. It is accordingly desirable to avoid this error and in the present embodiment this is done by preventing the signal generated in the winding of the rotor 5 from being effective to precess the gyroscope when the craft banks through more than a predetermined angle during the turn.

In order to detect bank of the craft there is provided a gyro-vertical, part of which is illustrated at 12. The parts of the gyro-vertical shown comprise the rotor-case 13, having a rotor mounted in it for spinning about a vertical axis 13' and a gimbal ring 14 in which the rotor case is mounted about an athwartship's axis. The gimbal ring is pivoted in a housing (not shown) about the fore-and-aft axis of the craft, the fore-and-aft trunnions being illustrated at 15 and 16. On the trunnion 16 there is provided a simple switch 17 comprising a conducting disc 18 having an insulated portion 19 covering approximately 6° of the rim of the disc. Two contacting members 20 and 21, fixed relative to the instrument housing, are provided, the member 20 being connected to earth and the member 21 being connected through lead 22 to the lead 23 by which the amplifier 7 is supplied from the winding of the rotor 5.

When there is no bank of the craft the contacting member 21 is substantially at the centre of the insulated portion 19 so that the switch has no effect on the signals passed along the lead 23. If however a bank of the craft of more than ±3° occurs during a turn of the craft the contacting member 21 will be turned relative to the disc 18 so as to move off the insulated portion 19. As a result, the signal generated in the winding of the rotor 5, instead of being passed to the amplifier 7, will be earthed and will therefore be ineffective to precess the gyroscope. When the turn is completed and the bank of the craft is removed the contacting member 21 will again be positioned substantially at the centre of the insulated portion 19 so that the switch 18 is again ineffective and the gyro-magnetic compass functions normally.

It will be appreciated that various modifications of the invention may be made without departing from the scope thereof. For example, the switch 18 may be used for energising a relay from a suitable source for operating another switch for disconnecting lead 23 from the amplifier 7.

It may be desirable also during a banked turn to cut out the erection device which is normally used in such compasses to level the spin axis 27' of gyroscope 27, such torquer 25 acting about the vertical axis and governed by a controller responsive to tilt of the gyro, such as contacting segment 26 rotatable with the gyro case 27 with which a fixed contact on the vertical ring 6 cooperates, so that whenever the gyro case becomes inclined with respect to the vertical ring current is passed through the torquer 25 in one direction or the other to erect the gyro case with respect to the vertical ring. In this case, I include in the controller torquer circuit a second cutout switch 28 similar to the first switch 19, above described, and which shorts the current through the torquer upon the craft's banking more than a predetermined amount. As shown, this second switch may conveniently be operated by the same shaft 16 that operates the first switch 17.

The invention may also be applied to eliminate the erecting torques applied by the gravity-responsive device, i. e. the reference control member, of a gyro-vertical itself during banks greater than the predetermined angle. In such a case, however, it will of course be necessary to provide a safeguard since if the gyroscope itself tilts more than the predetermined angle it will not erect itself because the erecting device will have been cut out. Such a tilt does not normally take place when the instrument is in operation unless it is considerably disturbed. However, a large tilt usually exists when the gyroscope is initially operated, such as on an airfield, and it is primarily for this purpose that the safeguard is necessary. The safeguard may conveniently take the form of a device operable at will to render the arrangement in accordance with the invention ineffective.

We claim:

1. In a gyro-magnetic compass for aircraft, a directional gyroscope, a gyro-vertical, a magnetic compass, means controlled by the magnetic compass for preventing deviation of the gyroscope due to wandering and a cut-out on the gyro-vertical brought into action by a bank of the craft of more than a predetermined amount, said cut-out rendering said deviation preventing means acting between said magnetic compass and said directional gyroscope temporarily ineffective.

2. In a gyro-magnetic compass for aircraft, a directional gyroscope for indicating the heading, a gyro-vertical, a magnetic compass, means controlled jointly by the magnetic compass and directional gyroscope for slaving the latter and thereby prevent wandering, and a controller on the gyro-vertical brought into action by a bank of the craft of more than a predetermined amount, said controller rendering said slaving means ineffective during such banks.

3. A course indicating means for aircraft, comprising a gyroscope of the directional or three-degree of freedom type and a magnetic compass, both of which normally operate together to indicate heading, a gyro-vertical, and means controlled thereby for severing the effect of the compass upon the indicated heading during bank of the craft of more than a predetermined amount whereby compass deflection during turns does not cause heading error.

4. A course indicating means for aircraft, as claimed in claim 3, in which the directional gyroscope has a leveling device and said gyro-vertical controlled means also renders said leveling device ineffective during bank of the character described.

5. In position maintaining gyroscopic apparatus for aircraft, a gyroscope having a spin axis, means causing said gyroscope to maintain its spin axis in a predetermined direction with respect to the earth including a torquer for applying torques about an axis normal to said spin axis, a controller therefor, means detecting deviation of said spin axis from its predetermined position and generating a signal normally controlling said torquer, means for detecting pronounced bank of the craft including a gyrovertical, and means responsive to said last-named means to interrupt the control of said torquer from said controller when the craft is banked more than a predetermined angle.

6. In a directional apparatus for aircraft, a directional gyroscope, a levelling device thereon including a torquer for applying a torque about the vertical axis of the gyroscope, a controller for said torquer for detecting tilt of said gyro about its horizontal axis for controlling said torquer, a gyro vertical, means thereon for detecting pronounced bank of the craft and means responsive to said last-named means to interrupt the control of said torquer from said tilt controller when the craft is banked more than a predetermined angle.

ARTHUR PHILIP GLENNY.
DIMITRI WALOFF.

References Cited in the file of this patent
UNITED STATES PATENTS

| Number | Name | Date |
|---|---|---|
| 2,238,645 | Horn | Apr. 15, 1941 |
| 2,357,319 | Esval et al. | Sept. 5, 1944 |
| 2,412,204 | Carter et al. | Dec. 10, 1946 |
| 2,441,556 | Bolster | May 18, 1948 |
| 2,450,320 | Wendt | Sept. 28, 1948 |
| 2,468,113 | Russ | Apr. 26, 1949 |
| 2,505,021 | Weems et al. | Apr. 25, 1950 |
| 2,561,367 | Haskins, Jr. | July 24, 1951 |